(12) United States Patent
McKenney et al.

(10) Patent No.: US 7,478,204 B2
(45) Date of Patent: Jan. 13, 2009

(54) EFFICIENT SHARING OF MEMORY BETWEEN APPLICATIONS RUNNING UNDER DIFFERENT OPERATING SYSTEMS ON A SHARED HARDWARE SYSTEM

(75) Inventors: Paul E. McKenney, Beaverton, OR (US); Orran Y. Krieger, Newton, MA (US); Michal Ostrowski, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 10/834,699

(22) Filed: Apr. 29, 2004

(65) Prior Publication Data

US 2005/0246505 A1 Nov. 3, 2005

(51) Int. Cl.
*G06F 12/02* (2006.01)
*G06F 9/50* (2006.01)

(52) U.S. Cl. ...................... 711/151; 719/319

(58) Field of Classification Search .............. None
See application file for complete search history.

(56) References Cited

U.S. PATENT DOCUMENTS

| | | | |
|---|---|---|---|
| 4,636,942 A | 1/1987 | Chen et al. ............. 364/200 |
| 6,075,938 A | 6/2000 | Bugnion et al. ........ 395/500.48 |
| 6,314,501 B1 | 11/2001 | Gulick et al. ............. 711/153 |
| 6,332,180 B1 | 12/2001 | Kauffman et al. ......... 711/153 |
| 6,418,460 B1 | 7/2002 | Bitar et al. ................ 709/108 |
| 6,466,962 B2* | 10/2002 | Bollella .................... 718/107 |
| 6,473,819 B1 | 10/2002 | Jackson et al. ............. 710/200 |
| 6,546,546 B1* | 4/2003 | Van Doorn ................. 717/114 |
| 6,792,516 B2* | 9/2004 | Mastronarde et al. ....... 711/158 |
| 2002/0052914 A1 | 5/2002 | Zalewski et al. ............ 709/203 |
| 2003/0159086 A1 | 8/2003 | Arndt ........................ 714/25 |
| 2004/0268354 A1* | 12/2004 | Kanai et al. ................. 718/100 |
| 2005/0223302 A1* | 10/2005 | Bono ......................... 714/55 |

FOREIGN PATENT DOCUMENTS

JP 2001154872 6/2001

OTHER PUBLICATIONS

Kontothanassis et al., "Scheduler-Conscious Synchronization," Transactions on Computer Systems (TOCS) (Feb. 1997).

* cited by examiner

*Primary Examiner*—Gary J Portka
(74) *Attorney, Agent, or Firm*—Walter W. Duft; Abdy Raissinia

(57) ABSTRACT

A system, method and computer program product for efficient sharing of memory between first and second applications running under first and second operating systems on a shared hardware system. The hardware system runs a hypervisor that supports concurrent execution of the first and second operating systems, and further includes a region of shared memory managed on behalf of the first and second applications. Techniques are used to avoid preemption when the first application is accessing the shared memory region. In this way, the second application will not be unduly delayed when attempting to access the shared memory region due to delays stemming from the first application's access of the shared memory region. This is especially advantageous when the second application and operating system are adapted for real-time processing. Additional benefits can be obtained by taking steps to minimize memory access faults.

9 Claims, 5 Drawing Sheets

EFFICIENT SHARING OF MEMORY BETWEEN APPLICATIONS RUNNING UNDER DIFFERENT OPERATING SYSTEMS ON A SHARED HARDWARE SYSTEM

BACKGROUND OF THE INVENTION

1. Field of the Invention

This invention relates to data processing apparatus and the concurrent execution of plural operating systems using virtual machine technology. More particularly, the invention is directed to techniques for sharing memory between such operating systems and their applications while ensuring that no one application unduly delays any other from accessing the shared memory.

2. Description of the Prior Art

By way of background, many currently available computer platforms are capable of supporting concurrent operating system execution using the notion of virtual machines. According to this technology, a super-privileged control program known as a hypervisor or virtual machine monitor (VMM) provides an interface between each operating system and the underlying hardware. By managing memory, I/O device access, and CPU scheduling, the hypervisor provides safe virtual machine environments for its operating systems.

A benefit of running plural operating systems on a single hardware platform is that different applications can run concurrently on the various operating systems while cooperatively sharing data using a region of shared memory as a high bandwidth and low latency communication channel. However, problems can arise when conventional mutual exclusion techniques are employed to guard the shared data as it is being accessed. For example, although various types of spinlocks are used pervasively on multiprocessor platforms running single operating systems, spinlocks can have unintended consequences in a multi-operating system environment. In particular, an application of one operating system that holds a lock while in a critical section can be preempted by the hypervisor, or preempted by the operating system, or the application may take a page fault. In that case, a concurrently running application of a different operating system might be unduly delayed waiting for the first application to complete the critical section and release the spinlock. Such delay may be unacceptable in many situations, especially if the delayed application is performing real-time processing.

There are prior art scheduling solutions for single operating system environments to prevent the preemption of applications holding locks. As far as known, however, no such protections have been proposed for multi-operating system environments, especially those in which real-time applications share data with non-real-time applications. Nor do the foregoing scheduling solutions address the issue of page faults. It would be desirable, therefore, to provide a technique whereby data sharing can be implemented in a multi-operating system environment while ensuring fairness for all applications. What is particularly needed is a solution that accommodates all of the usual mutual-exclusion mechanisms, such as spinlocks, but without the attendant problems noted above.

SUMMARY OF THE INVENTION

The foregoing problems are solved and an advance in the art is obtained by a novel system, method and computer program product for efficient sharing of memory between first and second applications running under first and second operating systems on a shared hardware system. The hardware system runs a hypervisor that supports concurrent execution of the first and second operating systems, and further includes a region of shared memory managed on behalf of the first and second applications. According to the invention, preemption of the first application is avoided when the first application is accessing the shared memory region. In this way, the second application will not be unduly delayed when attempting to access the shared memory region due to delays stemming from the first application's access of the shared memory region. This is especially advantageous when the second application and operating system are adapted for real-time processing. Additional benefits can be obtained by taking steps to minimize memory access faults.

BRIEF DESCRIPTION OF THE DRAWINGS

The foregoing and other features and advantages of the invention will be apparent from the following more particular description of preferred embodiments of the invention, as illustrated in the accompanying Drawings, in which.

DETAILED DESCRIPTION OF THE PREFERRED EMBODIMENTS

Figure 1:
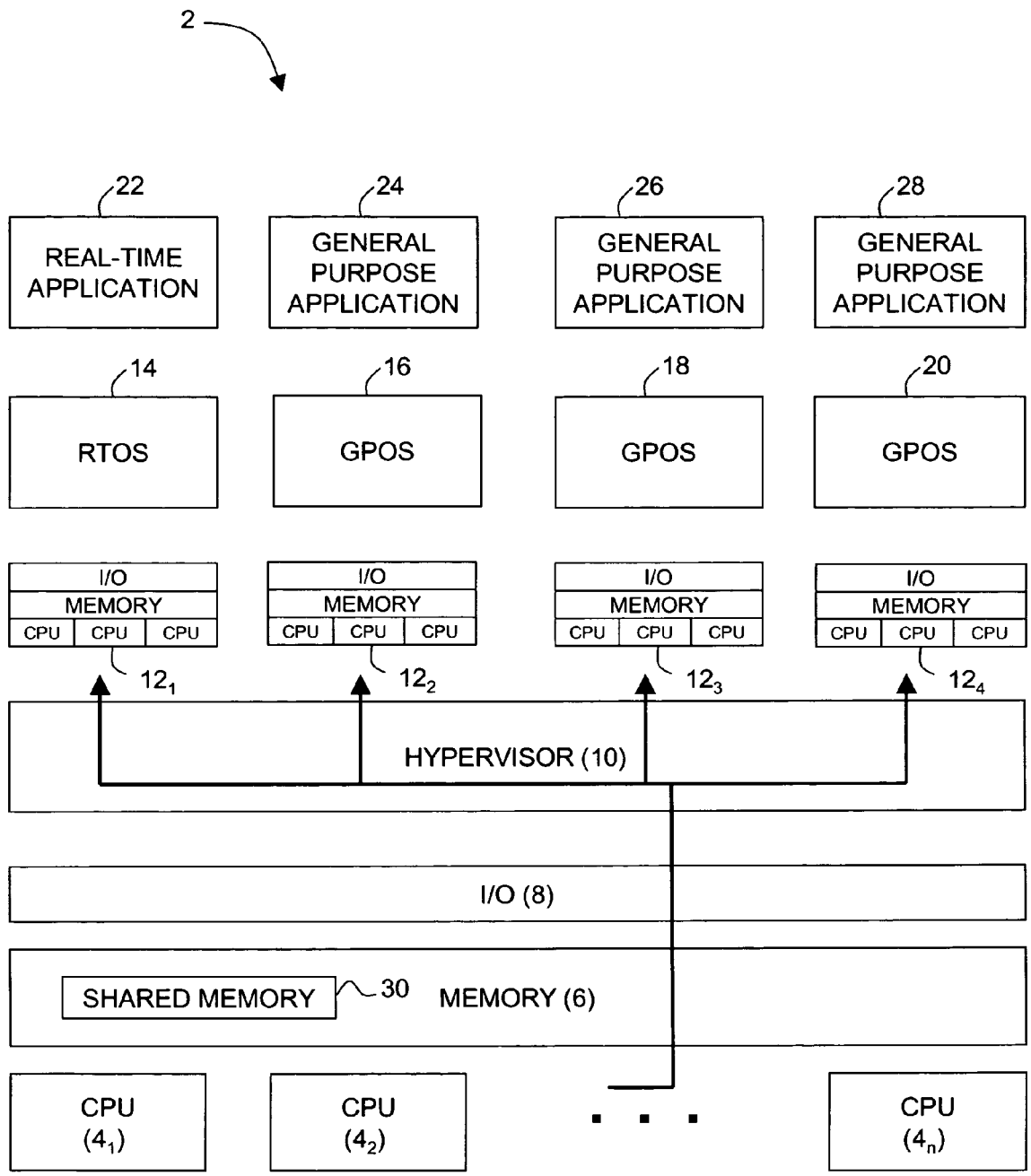
FIG. 1 is a functional block diagram showing a system of shared data processing hardware resources, with the system running a hypervisor and virtual machine environments for plural operating systems and applications.

The invention will now be described by way of exemplary embodiments shown by the drawing figures, in which like reference numerals indicate like elements in all of the several views.

Turning to FIG. 1, a data processing system 2 that may be used to implement the invention is configured with a collection of shared data processing hardware resources that include one or more central processing units (CPUs) $4_1$, $4_2 \ldots 4_n$, a memory 6, and a set of input/output (I/O) facilities 8. A hypervisor program 10, also known as a virtual machine monitor or VMM, executes on the system 2 to provide virtual machine (VM) environments for various operating system instances and application programs to be described in more detail below. Except as otherwise indicated below relative to the handling of application preemption, the hypervisor 10 is assumed to be conventional in nature. As such, it can be implemented according to any of the VMM design concepts that have been in use since hypervisors were first developed in the late 1960s (taking into account the VM support capabilities of the underlying hardware). Well known examples of commercial hypervisors include the CP Control Program used in the IBM VM/370® mainframe product introduced by International Business Machines Corporation in 1972, the current z/VM® hypervisor used in the IBM zSeries® mainframe product, and the hypervisor used in the IBM pSeries® and iSeries™ PowerPC products. Note that the reference to the foregoing commercial products is not intended to suggest that the invention is limited to mainframe or midrange computing environments with extensive hardware resources.

Quite the contrary, it is preferable that the invention be capable of implementation on any hardware platform having the ability to support virtual machine environments and concurrent operating system operations through the addition of appropriate hypervisor functionality. This includes platforms based on the Intel x86 architecture, which although not ideally suited for supporting virtualization, can be so adapted with the use of commercially available software such as one of the VMWare® products from VMware, Inc. Embedded systems are also of interest for implementation of the invention in real time application environments. In such systems, the available hardware resources could be quite modest (e.g., a single processor adapted for embedded system use, 4-8 MB of RAM per OS, a PCI (or ISA) I/O bus, and possibly a RAM disk, a ROM disk or a flash memory to support a file system).

As is well known to persons skilled in the art, a conventional hypervisor or VMM is a low level software service that virtualizes the underlying hardware to provide a subset of the CPU, memory and I/O resources (i.e., a virtual machine) on behalf of higher level "guests." In FIG. 1, the hypervisor 10 is shown to provide four VM environments $12_1$, $12_2$, $12_3$ and $12_4$ on behalf of four operating system instances 14, 16, 18 and 20. Note that one or more of these operating systems could be adapted to support real-time services. FIG. 1 assumes this to be the case and the operating system 14 is thus designated as being a real-time operating system (RTOS) while the remaining operating systems 16, 18 and 20 are designated as being general purpose operating systems (GPOS). Note that the RTOS 14 may implement "hard" real-time scheduling or "soft" real-time scheduling. In this context, the term "hard real-time" signifies a system whose timing behavior is wholly deterministic, such that response to an event can be guaranteed to occur within some fixed time. In contrast, the term "soft real-time" refers to a system that will do its best to service an event within a specified time, and will do so on average or a given fraction of the time, but cannot guarantee this result. Each of the operating systems 14, 16, 18 and 20 respectively run at least one application 22, 24, 26 and 28. In FIG. 1, the application 22 is assumed to be a real-time application that provides hard or soft real-time services and the applications 24, 26 and 28 are non-real-time applications. Note that the term "application" as used herein refers to the performance of a particular service or function and rather than to signify separate software that is distinct from an operating system. Although an application will in many cases be a distinct software program, it will typically issue system calls to run operating system kernel code during various stages of process execution. In other cases an application may consist of little or no code that could be considered separate from the operating system itself. For example, if one of the general purpose operating systems 16-20 is configured as a firewall appliance, almost all of the processing will take place in kernel mode.

The hypervisor 10 performs various functions that support concurrent operation of the operating systems 14-20 and their applications 22-28 on the system 2. In particular, the hypervisor 10 provides the plural virtual machine environments $12_1$, $12_2$, $12_3$ and $12_4$ by allocating CPU bandwidth and memory, and providing I/O interfaces for use within each virtual machine. Each operating system 14-20 and its application 22-28 running within a virtual machine $12_1$-$12_4$ behaves as if it were operating on real hardware, with the hypervisor facilitating such operation by (1) translating accesses to virtual memory and I/O space to real memory and I/O space accesses, (2) selectively distributing interrupts from I/O devices to the various operating systems for servicing, and (3) scheduling CPU process execution on a prioritized basis. Note that the operating systems 14-20 need not necessarily be unaware of the hypervisor 10 insofar as there are some operating systems that are designed, for efficiency reasons, to cooperate with a hypervisor. It should also be noted that the invention could be implemented with one of the operating systems running outside of the hypervisor 10 using a hardware sharing scheme such as that found in the VMWare® Workstation product from VMware, Inc.

Lastly, and of significance to the present invention, the hypervisor 10 supports the use of a common area of shared memory 30 by each of the applications 22-28. To that end, a special driver (not shown) can be inserted in each operating system 14-20 to interact with the hypervisor 10 and map the shared memory to the applications 22-28. Such drivers are conventionally known in the art.

It will be appreciated in light of the foregoing that the system 2 provides an environment in which each of the applications 22-28 can access shared data structures in the shared memory area 30. To enable the applications 22-28 to use the shared memory 30 for intercommunication, there must additionally be some mechanism for synchronizing access to shared data structures. For example, the system 2 can implement asynchronous and synchronous IPC (InterProcess Communication) services to send messages describing data put into the shared memory 30. If standard LL/SC (Load Linked/Store Conditional) primitives are available, shared lists can be implemented using non-blocking synchronization techniques. If CAS2 (Compare And Swap) support is provided, a richer set of non-blocking primitives is possible. However, in many situations it is preferable to use straightforward locking primitives.

In that case, as stated by way of background above, some mechanism is needed to ensure that applications holding locks are not delayed while in the critical section. In the context of a hypervisor-supported, multi-operating system environment wherein data can be shared between real-time and non-real-time applications, as exemplified by the system 2 of FIG. 1, it is important that the non-real-time applications 24-28 never unduly delay the real-time application 22 by holding a critical lock for too long. This could happen in two ways. First, one of the non-real-time applications 24-28 could be preempted while executing the critical section by some higher-priority code path (e.g., by a scheduler, a device interrupt handler, a trap handler). Second, one of the non-real-time applications 24-28 could take a memory access fault because code or data required for critical section execution is not yet available to the application. Although a memory access fault results in preemption (requiring a page fault handler or other code to run), it presents a special case because the preemption is unavoidable (i.e., the application needs the memory access fault to be resolved so that it can proceed through the critical section).

In the remainder of the discussion, solutions for avoiding preemption as a result of scheduling, device interrupts, trap exceptions or the like are disclosed. Thereafter, solutions for avoiding memory access faults are additionally set forth. It is further assumed that the non-real-time applications 24-28 of FIG. 1 (whether running in user mode or kernel mode) are the entities which cannot be delayed by preemption or faults during critical section execution, and that the real-time application 22 is the entity that would be negatively impacted by such delay as a result of being denied access to locked data in the shared memory 30.

Avoiding Preemption

There are two general approaches proposed in accordance with the invention for solving the preemption problem:

1) Scheduler-conscious synchronization, where an application-controlled flag indicator is used to suppress preemption for a short time; and 2) Preemption-immune protected code sequences, where the hypervisor provides code sequences for selected common operations in a read-only section of memory that is mapped into applications requiring this, and where the program counter acts as a non-preemption indicator to the hypervisor and operating systems.

The idea behind both approaches is to use indicators that enable the hypervisor 10, the operating systems 14-20, and the applications 22-28 to communicate preemption information to each other. These indicators can be values stored in a CPU register or a predetermined memory location. Alternatively, the indicators could be represented as a predetermined set of program-counter values corresponding to critical code sections. Some of the indicators are application-controlled insofar as they can be set by the applications 22-28 (to be sensed and responded to by the hypervisor 10 and each of the operating systems 14-20). Other indicators are hypervisor/operating system-controlled insofar as they can be set by the hypervisor 10 and the operating systems 14-20 (to be sensed and responded to by the applications 22-28).

Scheduler-Conscious Synchronization

An application-controlled preemption-avoidance technique is described in a paper by Leonidas I. Kontothanassis, Robert W. Wisniewski and Michael L. Scott, entitled "Scheduler Conscious Synchronization," Transactions on Computer Systems (TOCS) (February 1997). The general idea underlying scheduler-conscious synchronization is for an application to keep a scheduler informed of when preemption is a problem due to execution of a critical section, so that the scheduler will suppress preemption while the application holds a critical section lock. In the referenced paper, the scheduler is a component of an operating system kernel. In the context of the present invention, both a hypervisor scheduler and an operating system scheduler can preempt an application, which introduces additional complexities, particularly in the area of managing "permissions" that govern whether an application is entitled to suppress preemption (see discussion below).

In the context of FIG. 1, when one of the applications 24-28 desires to prevent its own preemption, it sets an indicator, which shall be referred to as a "do not preempt" indicator, in some shared location that is accessible by the application, its respective operating system 16-20, and the hypervisor 10. The shared location could be a register in the CPU that runs the application 24-28, or an area of memory reserved for this purpose. The memory area could be local to each application 24-28 and its operating system 16-20, or it could be globally shared with the other applications and operating systems, such as the shared memory 30.

Figure 2:
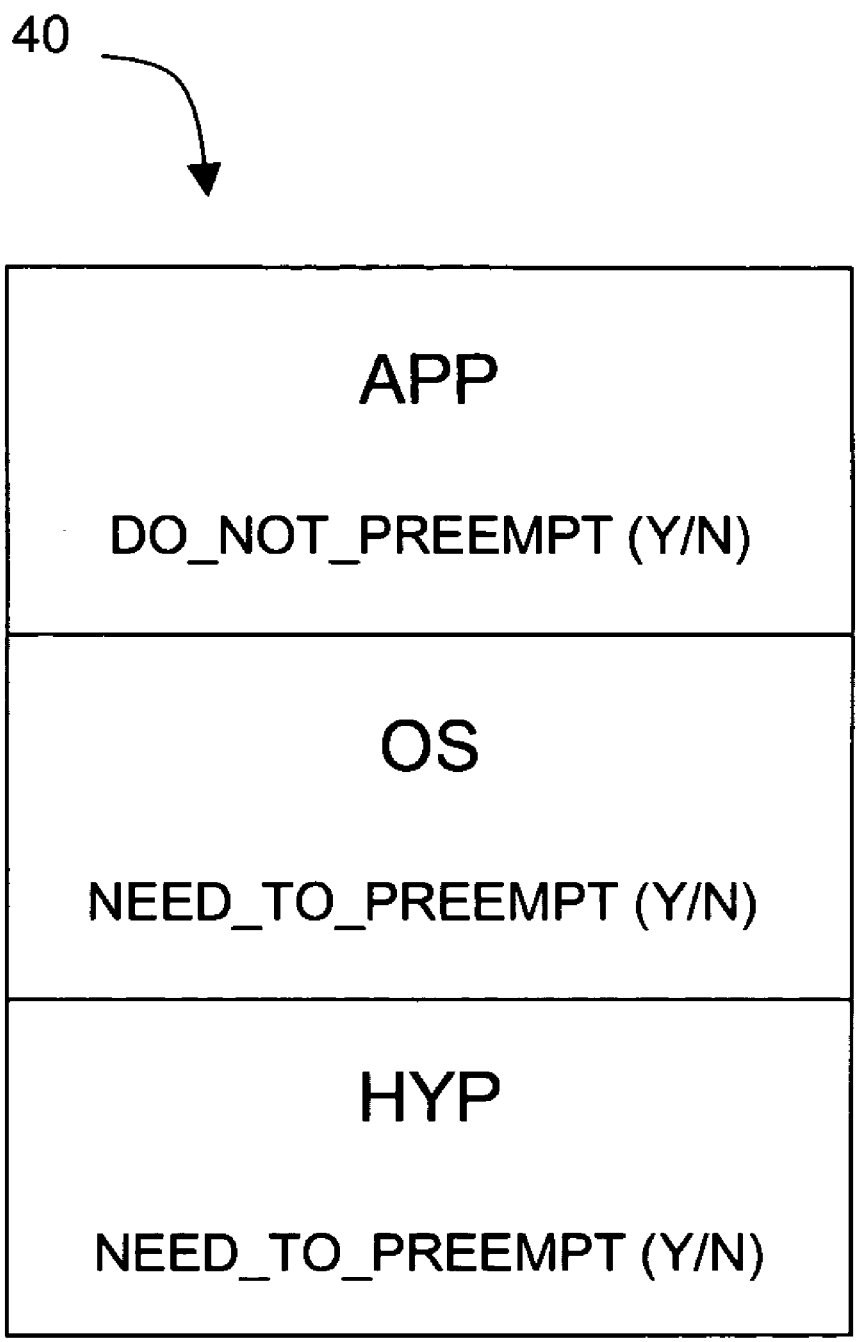
FIG. 2 is a diagrammatic illustration of a linked list of data structures containing variables used to indicate preemption information.

FIG. 2 shows the format of an exemplary data structure 40 that can be used by the applications 24-28 to set a do not preempt indicator. This do not preempt indicator, which could be a flag or other variable, is shown by the designation "APP" to signify that it is controlled by an application. Each application's do not preempt indicator should be readable and writeable by code having a user-mode privilege level if the shared memory 30 is accessed when an application 24-28 runs in user mode. If the shared memory 30 is only accessed when the application 24-28 runs in operating system kernel mode, the do not preempt indicator need not be accessible to user code because it would always be set by kernel code running with operating system privileges.

Each application 24-28 would be expected to set its do not preempt indicator prior to entering a critical section in which preemption while the application is locked on a shared data structure could negatively affect the real-time application 22 that needs to access the same data. The hypervisor 10, as well as the operating system 26-20 associated with a currently running application 24-28, would be expected to consult the application's do not preempt indicator prior to performing a context switch or servicing an interrupt or a trap. If the do not preempt indicator is set, such operations would be deferred until the application emerges from the critical section. In order to retain functionality when the applications 24-28 run their critical sections in user mode, non-preemption preferably does not include the system-call path, and the operating systems 16-20 need not check the do not preempt indicator when a system call is made. System calls will thus preempt even though preemption is disabled, and this will be desirable in most cases.

A second indicator, which shall be referred to as a "need_to_preempt" indicator, is used to indicate a desire by the hypervisor 10 or the operating systems 16-20 to preempt. The applications 24-28 are expected to sample this indicator at the end of a critical section, and to voluntarily relinquish the CPU if required. In FIG. 2, there are two need_to_preempt indicators shown as additional elements of the data structure 40. These need_to_preempt indictors are respectively shown by the designations "OS" and "HYP" to signify that they are associated with either an operating system 16-20 or the hypervisor 10. Each need_to_preempt indicator is readable at user-mode privilege level but is writeable only at an elevated privileged level. In particular, the OS need_to_preempt indicator can only be written by entities having at least an operating system privilege level, and the HYP need_to_preempt indicator can only be written at hypervisor privilege level. In an alternative implementation, the operating systems 16-20 could use the same need_to_preempt indicator as the hypervisor 10. However, if the need_to_preempt indicator is only writeable at hypervisor privilege level, the operating systems 16-20 will need to yield to the hypervisor 10 by way of a hypervisor call in order to manipulate this variable.

To handle erroneous code, or low probability events (e.g. page faults if the techniques in the next section are not used), the hypervisor 10 or the operating systems 16-20 can override an application 24-28 and schedule an interrupt to force preemption if the application has not yielded by that time. On the other hand, if the applications 24-28 are trusted, they may be permitted to suppress preemption indefinitely. Trust may be indicated by a per-user permission flag (e.g., superuser or vectored-superuser permissions) or by possession of some key or digital signature.

Interrupts are handled depending on whether they are directed to the hypervisor 10 or an operating system 16-20. For interrupts that go to the hypervisor 10 first, the hypervisor needs to check for an application's do not preempt indicator, and if one is set, must set a need_to_preempt indicator and delay interrupt delivery to the application's operating system 16-20 until the protected code sequence has completed. When these interrupts are delivered, the operating system 16-20 does not need to perform a non-preemption check. For interrupts directed to an operating system 16-20 rather than the hypervisor 10, the operating system's interrupt path must perform the check for a non-preemption indicator.

Traps generated by application execution will normally be directed to the operating systems 16-20, so these code paths may need to be modified to suppress preemption in the manner described above. Trap code paths are arguably less performance-critical than interrupt paths, so that deferring preemption should not be as much of a problem. However, it is desirable that application critical section code sequences be written to avoid traps in order to minimize the rewriting of operating system trap sequence code.

Figure 3:
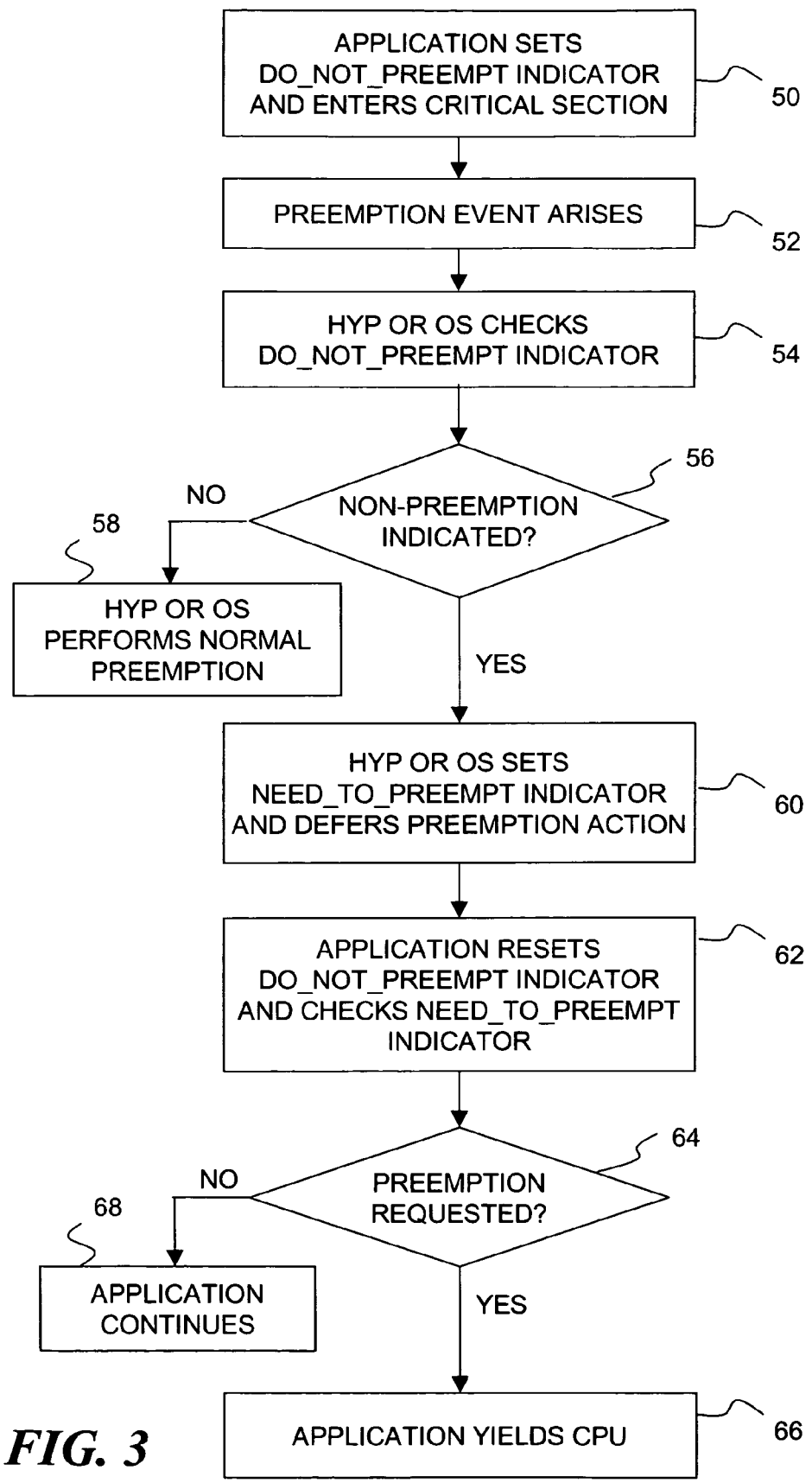
FIG. 3 is a flow diagram illustrating an exchange of preemption information between an application accessing shared memory and an operating system or hypervisor.

FIG. 3 illustrates exemplary logic that may be used to implement scheduler-conscious synchronization in accordance with the invention. Beginning in step 50, an application 24-28 that desires not to be preempted during execution of a critical section that references shared data sets its APP do not preempt indicator and begins critical section execution. In step 52, a hardware or software preemption event passes control to the hypervisor 10 or the application's operating system 16-20, and it is determined that the application 24-28 needs to be preempted, e.g., due to expiration of the application's scheduling quantum, a device interrupt, or a trap. In steps 54 and 56, the hypervisor 10 or the operating system 16-20 tests whether the application 24-28 is attempting to suppress preemption. If the application's do not preempt indicator is not set, normal preemption occurs in step 58. If the do not preempt indicator is set, the hypervisor 10 or the operating system 16-20 may wish to check to determine whether the application is permitted to suppress preemption (e.g., to prevent a rogue application from exploiting the preemption suppression mechanism). Whereas the operating system 16-20 would normally be aware of the application's permission status, the hypervisor 10 might not. One way for the operating system 16-20 to share this information would be to store an application permission indicator in a register, a memory location, etc, that is accessible to the hypervisor 10, but which cannot be accessed by the application. Another way of sharing application permission information with the hypervisor 10 could be used if the system 2 was configured so that all hypervisor-handled interrupts and exceptions were delivered via the operating systems 16-20. In that case, the operating system 16-20 could also pass an application's permission status (and perhaps the application's do not preempt indicator as well).

Assuming the application is permitted to suppress, the operating system 16-20 or the hypervisor 10 sets a need_to_preempt indicator in step 60 indicating that preemption is desired, then defers the preemption action and returns control to the application 24-28. In step 62, the application 24-28 completes its critical section, resets the do not preempt indicator, and checks the need_to_preempt indicator. If the need_to_preempt indicator is set, the application 24-28 yields control of the CPU(s) $4_1$-$4_n$ in step 66 (e.g., by issuing an ioctl( ) call to the device used to map the shared memory). If not, the application 24-28 continues execution in normal fashion in step 68.

Preemption-Immune Protected Code Sequences

An alternative to using scheduler-conscious synchronization to determine when the applications 24-28 are non-preemptable is to use protected critical section code sequences that are provided by the hypervisor 10 and mapped into the application at a predetermined address. It is noted that code sequences of this type are used to prevent critical section preemption in a non-hypervisor environment in the DYNIX/PTX® operating system from International Business Machines Corporation.

Such protected code sequences would be stored at predetermined virtual addresses. The program counter (PC) range values implemented when the applications 24-28 run such code segments may be used as do not preempt indicators that the hypervisor 10 and the operating systems 16-20 consult to determine when preemption must be suppressed. The same need_to_preempt indicators discussed in the previous section may be used to force the applications 24-28 to yield the CPU(s) $4_1$-$4_n$ at the end of critical sections. In other words, the logic flow of FIG. 3 applies to the use of preemption-immune code sequences just as it does when scheduler-conscious synchronization is implemented, except that the do not preempt indicator is a program counter range and is not "set" by the applications 24-28 per se.

This is not to say that the two methods are completely synonymous, and it is noted that problems can arise when the hypervisor 10 is required to use program counter range values as do not preempt indicators. In that case, if there is an interrupt or a trap request being processed by an operating system 16-20, the current program counter value would be that of a generic kernel code path and not the application's protected code sequence. This could occur, for example, if an operating system 16-20 takes a TLB (Translation Look Aside Buffer) fault while an application 24-28 is executing the protected code. The hypervisor 10 needs to recognize that preemption must be prohibited, but the program counter value of the protected code sequence would be buried in the kernel stack.

One solution to this problem is to arrange for operating system interrupt or trap code paths to be themselves protected. For example, such code paths could be located at the same virtual address range where the application's protected code sequences are located. Other alternatives also exist. For example, provision could be made for the operating systems 16-20 to explicitly register their interrupt and trap code paths as non-preemptible address ranges. Another alternative would be for the hypervisor 10 to call a pre-registered entry point into the operating systems 16-20 that determines whether the operating systems may be preempted. A still further alternative, assuming the operating system 16-20 are trusted, would be to allow the operating systems to disable all hypervisor-delivered interrupts during operating system interrupt or trap sequences so that the hypervisor 10 cannot gain control during these short but critical code sequences.

One other drawback associated with the use of preemption-immune code sequences is that the code sequences must be predetermined by the hypervisor 10 or a related policy module. This limitation can be circumvented if the applications 24-28 are trusted by allowing them to map arbitrary code into the protected virtual-address range. Insofar as the protected code sequences proposed herein are read-only, they may also be used if applications 24-28 are less trusted. It is possible that Byzantine applications could analyze the code sequences and potentially prevent preemption indefinitely by branching to inappropriate points in the code. However, this could be dealt with by setting a limit (either in the hypervisor 10 or an operating system 16-20) on the amount of time permitted in such code sequences.

Avoiding Memory Access Faults

Having now described mechanisms for dealing with preemption during the execution of application critical sections, the remainder of the discussion focuses on techniques for avoiding critical section memory access faults. It will be appreciated that a memory access fault can occur under many circumstances, including accesses to (1) explicitly shared memory, (2) program code, (3) data, (4) bss storage, (5) stack, (6) malloco space, and (7) memory-mapped regions (e.g., mmap( ) segments). In the ensuing discussion, techniques are disclosed for avoiding faults (1) during accesses to explicitly shared memory, (2) during accesses to data, bss storage, malloc( ) and mapped regions, and (3) during access to code and stack.

A twofold approach is proposed for managing critical section delays stemming from memory access events. For high overhead events such as page faults, the approach is to take steps to ensure that all data to be accessed within the critical section is situated in memory prior to its access. For low overhead events that produce less of a penalty, the approach is to take steps to minimize their occurrence rather than avoiding them entirely.

The following section dealing with accesses to explicitly shared memory illustrates the use of both of the foregoing approaches. The remaining sections discussing accesses to data, code and stack focus on use of the first approach of ensuring that the needed information is always available in memory.

Accesses to Explicitly Shared Memory

As described above, the shared memory region 30 of the system 2 must be mapped via a special driver. As such, the operating systems 16-20 will not attempt to page or swap out such memory. The shared memory region 30 will be fixed in the physical memory 6. This means that accesses to the shared memory 30 are immune from both major and minor page faults, where "major" page faults access mass storage and "minor" page faults reclaim the page from a pageout list. Notwithstanding the foregoing, four types of "lesser" faults can still occur while accessing the shared memory 30; namely: TLB faults, segment faults, inverted-page-table faults and cache misses. Note that an inverted page table fault is more like a TLB fault than a normal page fault insofar as an inverted page table (and its associated hash table) can be thought of as extensions to the TLB that are under software control.

A question that arises in relation to the handling of lesser faults is whether it is necessary to guarantee that the applications 24-28 are not perturbed by such events, or whether it is adequate merely to greatly reduce the probability that the events will occur. Although it is feasible to efficiently provide total guarantees, a simpler implementation with fewer operating system modifications can be used if it is decided that reducing the possibility of application perturbation is sufficient.

With respect to the four types of lesser faults discussed above, it is noted that each has relatively low overhead compared to major and minor page faults. Thus, it will be sufficient in most cases to tolerate such faults, but at the same time take steps to minimize their occurrence. By way of example, such steps may include:

1) Using large pages (to minimize TLB and inverted-page-table occupancy);
2) Careful choice of inverted-page-table replacement algorithms to avoid thrashing a given table entry;
3) Providing physically contiguous hypervisor shared memory to spread the memory across all CPU caches and avoid "hot spots;" and
4) Avoiding references to other memory regions, to minimize the number of segments accessed.

Note that an operating system 16-20 will gain control on any fault. Thus, if program counter-based, non-preemption indication is used, there needs to be some modification to the fault paths in order to prevent operating system level preemption by the hypervisor 10 if these events occur while preemption is supposed to be suppressed. As noted earlier, if the operating systems 16-20 are trusted, they may be allowed to inhibit all interrupts (including hypervisor level interrupts) during such code sequences can have the desired effect.

Accesses to Data, bss Storage, Malloc( ), and Mapped Regions

Figure 4:
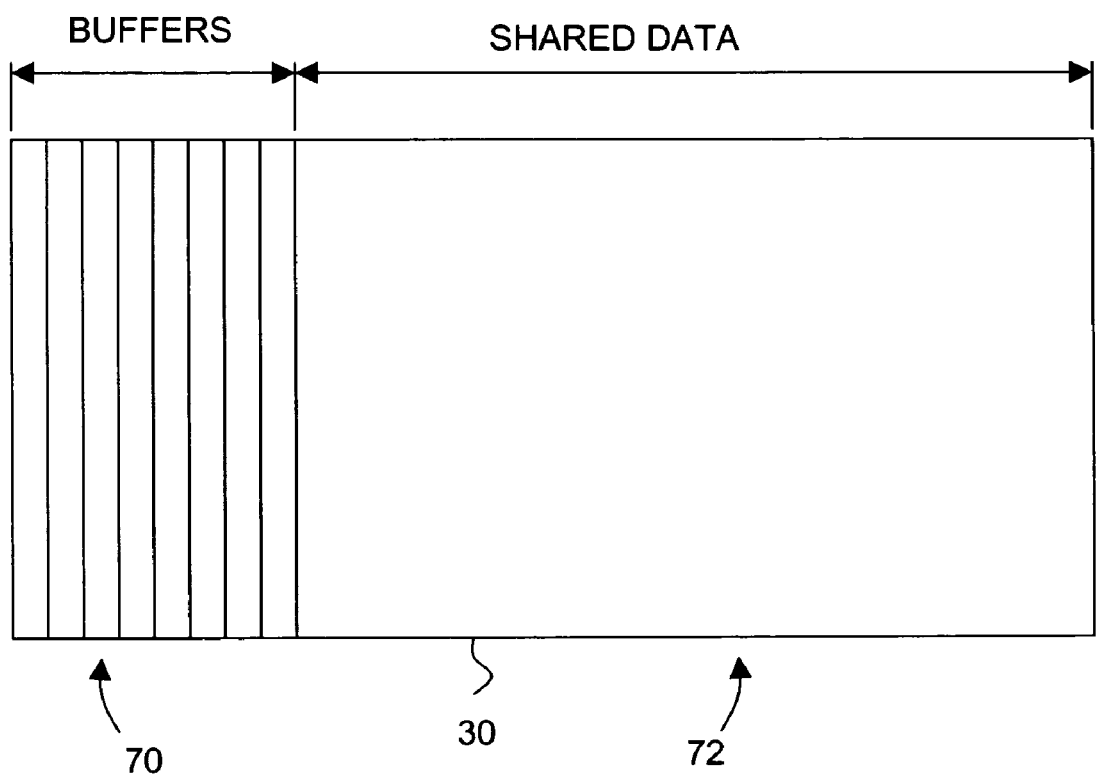
FIG. 4 is a diagrammatic illustration of a region of shared memory.
Figure 5:
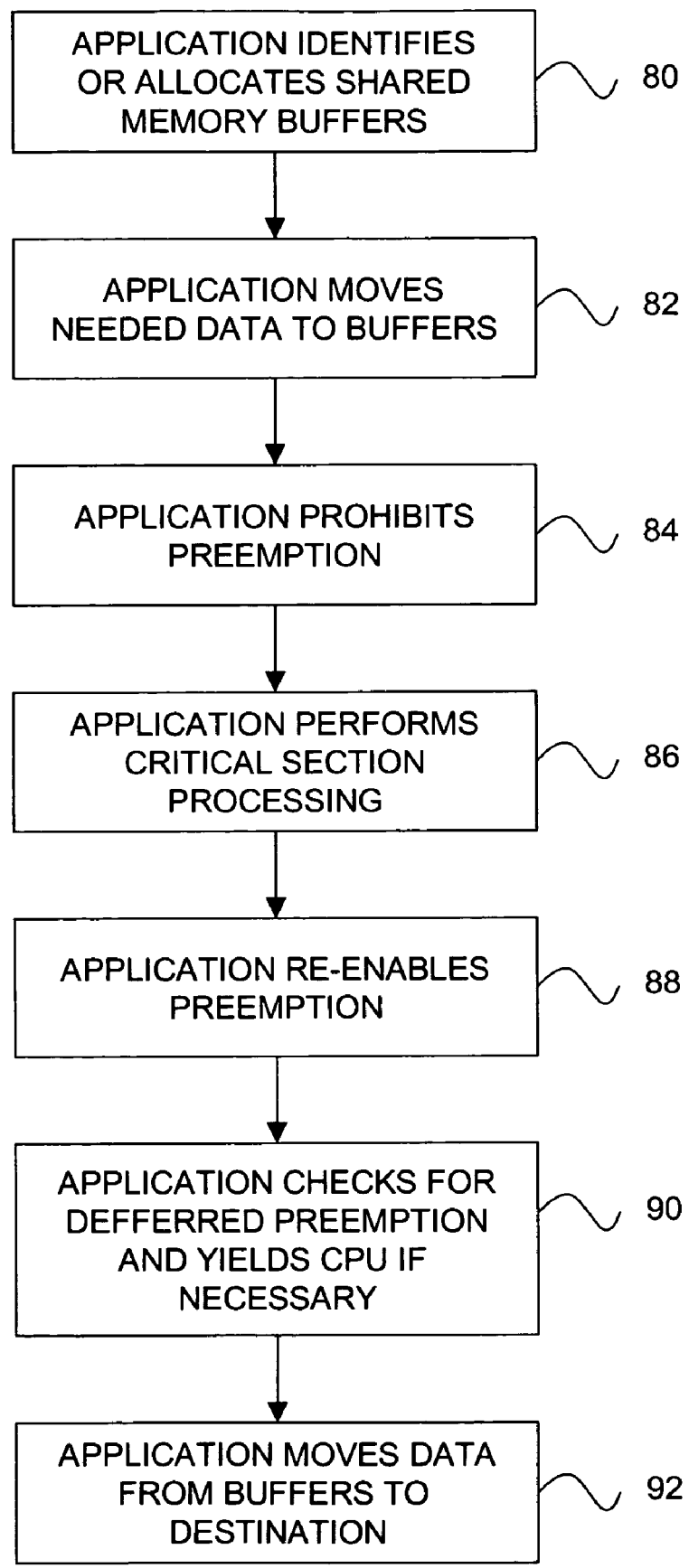
FIG. 5 is a flow diagram illustrating a technique for minimizing memory access faults while an application accesses shared memory.

The most straightforward way to avoid page faults on accesses to data, bss storage, malloc( ) space, and mapped regions of memory is for the applications 24-28 to avoid using conventionally managed memory space while executing critical sections. This can be accomplished, as shown in FIG. 4, by designating a portion of the shared memory region 30 as a buffer area 70 that is guaranteed to be resident in memory during critical section execution. The remaining area 72 of the shared memory region will be used for shared data. An application 24-28 would use the buffer area 70 to preload all anticipated data so that it will always be available during critical section execution. FIG. 5 illustrates an exemplary technique. In a first step 80, an application 24-28 identifies (or allocates) one or more buffers in the buffer area 70 of the shared memory 30. In step 82, the application 24-28 moves any needed data to the allocated buffers. In step 84, the application 24-28 prohibits preemption (by setting a do not preempt indicator or by branching to a protected address range, as described above). In step 86, the application 24-28 acquires any needed lock(s), performs critical-section processing, and releases the lock(s). In step 88, the application 24-28 re-enables preemption. In step 90, the application 24-28 checks for a need_to_preempt indicator to see if preemption has been deferred, and if so, it yields the CPU. In step 92, the application 24-28 moves any results from the buffer area to the desired destination when it receives the CPU, then releases the buffers.

It will be appreciated that use of the foregoing procedure will prevent page faults from occurring in data, bss storage, malloc, or mapped regions while an application 24-28 is in a critical section. Faults would occur in steps 82 and 92 (i.e., prior to and following critical section execution, respectively), when delays may safely occur.

Accesses to Code and Stack

Faults during accesses to code and stack are more difficult to avoid. One approach would be to relocate an application's code and stack to the buffer area 70 using the technique described above. This can be done at initialization time by copying the application's address space to the shared memory region 30 and mapping this back on top of the application's address space.

Another approach would be to provide an operating system interface to pin code and stack pages that are going to be referenced by an application 24-28 during the critical section. In many applications, it may be reasonable to keep code and stack pages pinned throughout the program's execution.

Accordingly, a mechanism for efficient sharing of memory between applications running under different operating systems on a shared hardware system has been disclosed. It will be appreciated that the inventive concepts may be variously embodied in any of a data processing system, a machine implemented method, and a computer program product in which programming means are recorded on one or more data storage media for use in controlling a data processing system to perform the required functions. While several embodiments of the invention have been shown and described, it should be apparent that many variations and alternative embodiments could be implemented. It is understood, therefore, that the invention is not to be in any way limited except in accordance with the spirit of the appended claims and their equivalents.

What is claimed is:

1. A method for efficient sharing of memory between applications running under different operating systems on a shared hardware system, comprising:

concurrently executing a first operating system, a first application adapted to execute under control of said first operating system, a second real-time operating system and a second real-time application adapted to execute under control of said second operating system, on a system of shared hardware resources with support from a hypervisor;

managing a region of shared memory on behalf of said first and second applications;

said first application periodically executing a critical section that accesses shared data in said shared memory region using a mutual exclusion mechanism that prevents said second application from simultaneously accessing said shared data;

said first application periodically emerging from said critical section;

conditionally avoiding preemption of said first application by both of said first operating system and said hypervisor when said first application is in said critical section accessing said shared data in said shared memory region but allowing preemption when said first application is not executing said critical section; and conditionally minimizing memory access faults due to said first application attempting to access data that is not in physical memory when said first application is in said critical section but allowing unrestricted memory access faults when said first application is not in said critical section;

whereby said second application will not be unduly delayed when attempting to access said shared memory region due to delays stemming from said first application's access of said shared memory region.

2. A method in accordance with claim 1 wherein said step of avoiding preemption includes a first step of indicating that said first application accessing said shared memory region is not to be preempted, and a second step of indicating that preemption of said first application has been deferred.

3. A method in accordance with claim 2 wherein said first indicating step comprises setting a do not preempt indicator that is controlled by said first application.

4. A method in accordance with claim 2 wherein said first indicating step comprises using a unique program counter range associated with a critical code section implemented by said first application when it accesses said shared memory region, said program counter being a processor instruction pointer that identifies a memory address of a program instruction executed by a processor.

5. A method in accordance with claim 2 wherein said second indicating step comprises setting a need to preempt indicator that is controlled by one or both of said first operating system and said hypervisor.

6. A method in accordance with claim 1 wherein said step of minimizing memory access faults comprises fixing virtual memory representing said shared memory region in physical memory.

7. A method in accordance with claim 1 wherein said step of minimizing memory access faults comprises minimizing translation look-aside buffer faults, segment faults, inverted-page-table faults and cache misses.

8. A method in accordance with claim 1 wherein said step of minimizing memory access faults comprises placing data needed by said first application in a buffer area of said shared memory region while accessing said shared memory region.

9. A method in accordance with claim 1 wherein said step of minimizing memory access faults comprises one of a step of placing code and stack pages used by said application in a buffer area of said shared memory region, or an alternative step of pinning code and stack pages used by said application.

* * * * *